(12) United States Patent  
Jung et al.

(10) Patent No.: US 8,018,428 B2
(45) Date of Patent: Sep. 13, 2011

(54) ELECTROPHORETIC DISPLAY PANEL, ELECTROPHORETIC DISPLAY DEVICE HAVING THE SAME AND METHOD FOR DRIVING THE SAME

(75) Inventors: Ho-Yong Jung, Yongin-si (KR); Cheol-Woo Park, Suwon-si (KR); Sung-Jin Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 950 days.

(21) Appl. No.: 11/926,838

(22) Filed: Oct. 29, 2007

(65) Prior Publication Data

US 2008/0122783 A1     May 29, 2008

(30) Foreign Application Priority Data

Nov. 27, 2006 (KR) .................. 10-2006-0117700
Jun. 12, 2007 (KR) .................. 10-2007-0056985

(51) Int. Cl.
*G09G 3/34* (2006.01)
*G06F 3/041* (2006.01)
(52) U.S. Cl. ...................... 345/107; 345/173
(58) Field of Classification Search .............. 345/107, 345/173
See application file for complete search history.

(56) References Cited

U.S. PATENT DOCUMENTS

| 4,345,248 A * | 8/1982 | Togashi et al. ............ 345/90 |
| 2005/0266590 A1 * | 12/2005 | Roh et al. ............ 438/22 |
| 2005/0280626 A1 * | 12/2005 | Amundson et al. ........ 345/107 |
| 2006/0152473 A1 * | 7/2006 | Johnson et al. ........... 345/107 |

OTHER PUBLICATIONS

Philips Data Sheet, "MOSFET N-channel enhancement switching transistor", Philips Semiconductors, Apr. 1991, p. 2.*

* cited by examiner

*Primary Examiner* — Richard Hjerpe
*Assistant Examiner* — Dorothy Harris
(74) *Attorney, Agent, or Firm* — Cantor Colburn LLP (57) ABSTRACT

An electrophoretic display ("EPD") panel includes a display substrate and an electrophoretic film. The display substrate includes a display switching element electrically connected to a display gate line and a data line crossing the display gate line, a pixel electrode electrically connected to the display switching element, and a sensing switching element electrically connected to a sensing gate line and the data line to detect a light quantity. The electrophoretic film is combined with the display substrate. The electrophoretic film includes a plurality of charged particles. Thus, a bias signal of the sensing switching element is delivered through the data line applying the data signal, so that a manufacturing process of the EPD panel may be simplified.

20 Claims, 8 Drawing Sheets

K-th DATA SIGNAL

FIG.5B

BLACK INTERVAL

FIG.5C

WHITE INTERVAL

ELECTROPHORETIC DISPLAY PANEL, ELECTROPHORETIC DISPLAY DEVICE HAVING THE SAME AND METHOD FOR DRIVING THE SAME

This application claims priority to Korean Patent Application No. 2006-117700 filed on Nov. 27, 2006 and Korean Patent Application No. 2007-56985 filed on Jun. 12, 2007, and all the benefits accruing therefrom under 35 U.S.C. §119, the contents of which in their entireties are herein incorporated by reference.

BACKGROUND OF THE INVENTION

1. Field of the Invention

The present invention relates to an electrophoretic display ("EPD") panel, an EPD device having the EPD panel and a method for driving the EPD device. More particularly, the present invention relates to an EPD panel manufactured by a simplified manufacturing process, an EPD device having the EPD panel, and a method for driving the EPD device.

2. Description of the Related Art

Generally, a touch screen panel includes a resistor type, a capacitor type, a light-sensor type, etc. Recently, the touch screen panel is disposed on a liquid crystal display ("LCD") panel to realize a display device, so that the display device may be used as an input device combined in a display device.

An integrated type LCD panel adapts the light sensor type that forms a light sensor using a thin-film transistor ("TFT") such as amorphous silicon ("a-Si") TFT, poly silicon TFT, etc., in an active area where an image is displayed. The light sensor includes a sensing TFT. When a control signal and a bias signal are applied to a control electrode of the sensing TFT and an input electrode of the sensing TFT, respectively, the sensing TFT is activated. Thus, the sensing TFT outputs a signal that corresponds to an external light through an output electrode thereof.

As a result, the integrated type LCD panel includes a plurality of data lines and a plurality of gate lines so as to display an image, and further includes a plurality of bias signal lines and a plurality of gate lines so as to detect a touch position.

BRIEF SUMMARY OF THE INVENTION

The present invention provides an electrophoretic display ("EPD") panel built-in a touch screen panel capable of decreasing the number of lines.

The present invention also provides an EPD device built-in a touch screen panel having the EPD panel.

The present invention also provides a method for driving the EPD panel built-in a touch screen panel.

In exemplary embodiments of the present invention, an EPD panel includes a display substrate and an electrophoretic film. The display substrate includes a display switching element electrically connected to a display gate line and a data line crossing the display gate line, a pixel electrode electrically connected to the display switching element and a sensing switching element electrically connected to a sensing gate line and the data line to detect a light quantity. The electrophoretic film is combined with the display substrate. The electrophoretic film includes a plurality of charged particles.

In other exemplary embodiments of the present invention, an EPD device includes an EPD panel and a driving section. The EPD panel includes a display switching element electrically connected to a display gate line and a data line, an electrophoretic capacitor electrically connected to the display switching element to include an electrophoretic layer, and a sensing switching element electrically connected to a sensing gate line and the data line to detect a light quantity. The driving section displays an image on the EPD panel by activating the display switching element during a first interval. The driving section receives a sensing signal by activating the sensing switching element during a second interval.

In still other exemplary embodiments of the present invention, there is provided a method for driving an EPD device. In the method, a data signal is applied to a data line electrically connected to an electrophoretic capacitor including charged particles to charge a data voltage to the electrophoretic capacitor during a first interval. Then, a bias signal of a sensing switching element is applied to the data line to output a sensing signal during a second interval.

According to the EPD panel, the EPD device having the EPD panel and the method for driving the EPD device, a bias signal of the sensing switching element is delivered through the data line that also applies the data signal, so that a manufacturing process of the EPD panel may be simplified.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The number of lines of an integrated liquid crystal display ("LCD") panel of the prior art is greater than that of LCD panels displaying only an image, and therefore a manufacturing process of such an integrated LCD panel may be complicated. Furthermore, an aperture ratio of such an integrated LCD panel may be decreased.

Hereinafter, the present invention will be described in detail with reference to the accompanying drawings.

Figure 1:
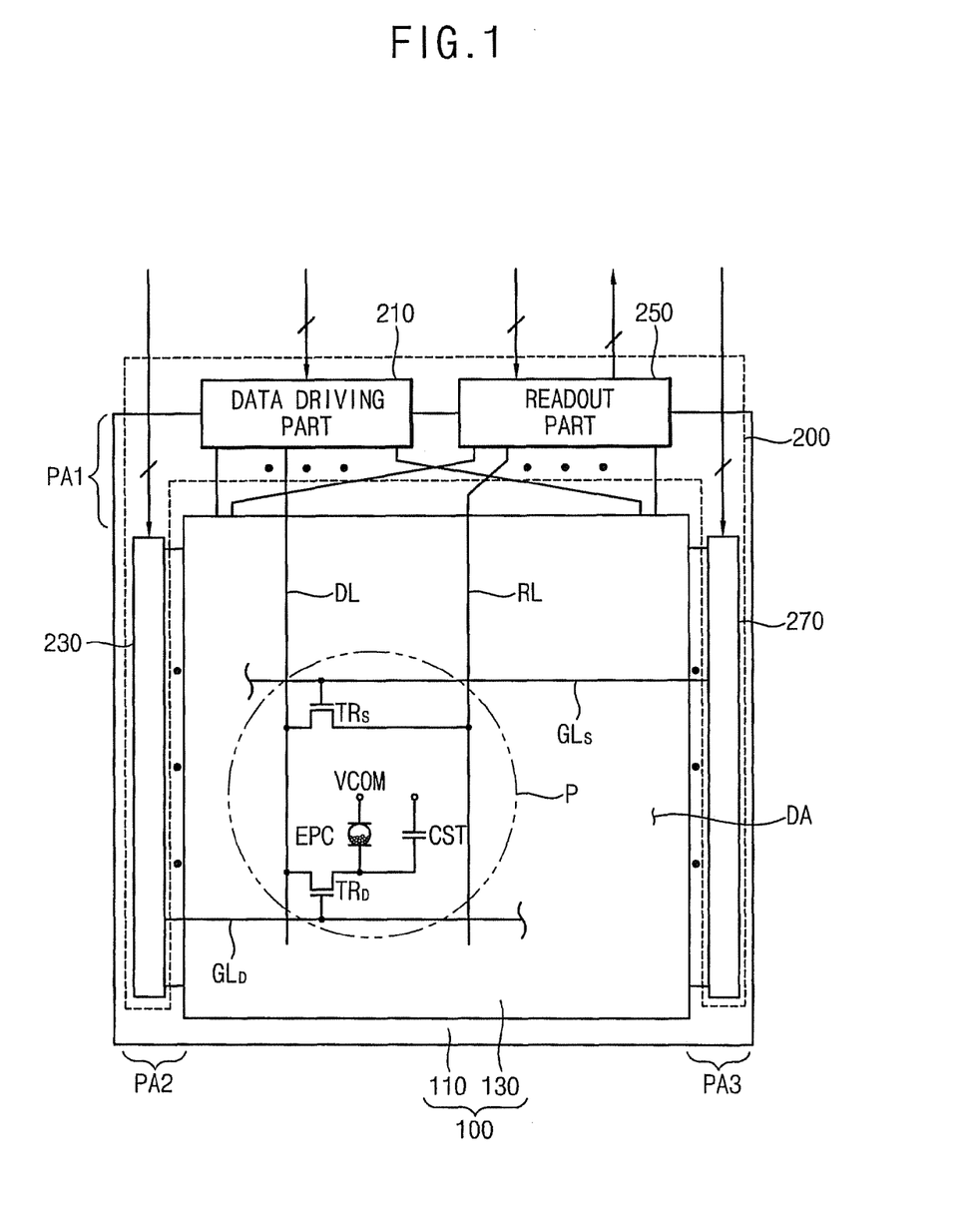
FIG. 1 is a plan view illustrating an exemplary electrophoretic display ("EPD") device according to an exemplary embodiment of the present invention.

FIG. 1 is a plan view illustrating an exemplary EPD device according to an exemplary embodiment of the present invention.

Referring to FIG. 1, an EPD device includes an EPD panel 100 and a driving section 200 driving the EPD panel 100.

The EPD panel 100 includes a display area DA having a plurality of pixel parts P displaying an image, and first, second and third peripheral areas PA1, PA2 and PA3 surrounding the display area DA.

Each pixel part P of the display area DA includes a display switching element $TR_D$ electrically connected to the data line DL and the display gate line $GL_D$, an electrophoretic capacitor EPC electrically connected to the display switching element $TR_D$, and a storage capacitor CST electrically connected to the electrophoretic capacitor EPC. The data voltage charged in the electrophoretic capacitor EPC and the storage capacitor CST may display an image.

The total or a portion of the pixel parts P may further include a sensing switching element $TR_S$ electrically connected to the data line DL, the sensing gate line $GL_S$, and a readout line RL, which is an output line. The sensing switching element $TR_S$ senses a light quantity and outputs a sensing signal to an external side through the readout line RL. That is, the pixel part P displays an image and senses the light quantity.

The driving section 200 includes a data driving part 210, a display gate driving part 230, a readout part 250, and a sensing gate driving part 270.

Each of the data driving part 210 and the readout part 250 may be mounted on the first peripheral area PA1 in a chip. Alternatively, each of the data driving part 210 and the readout part 250 may be mounted on the first peripheral area PA1 through a flexible printed circuit board ("FPCB").

The data driving part 210 outputs a data signal to the data line DL during a first interval, and outputs a bias signal to the data line DL during a second interval. The readout part 250 receives the sensing signal that is outputted through the readout line RL during the second interval.

The display gate driving part 230 is formed in the second peripheral area PA2. The display gate driving part 230 outputs a display gate signal to the display gate line $GL_D$ during the first interval.

The sensing gate driving part 270 is formed on the third peripheral area PA3. The sensing gate driving part 270 outputs a sensing gate signal to the sensing gate line $GL_S$ during the second interval.

Consequently, the driving section 200 may turn on the display switching element $TR_D$ of each pixel part P to transmit the data signal through the data line DL during the first interval, so that a data voltage corresponding to the data signal is charged in the electrophoretic capacitor EPC. The driving section 200 may also transmit the bias signal to the sensing switching element $TR_S$ through the data line DL during the second interval, so that a sensing signal is detected by activating the sensing switching element $TR_S$.

Figure 2:
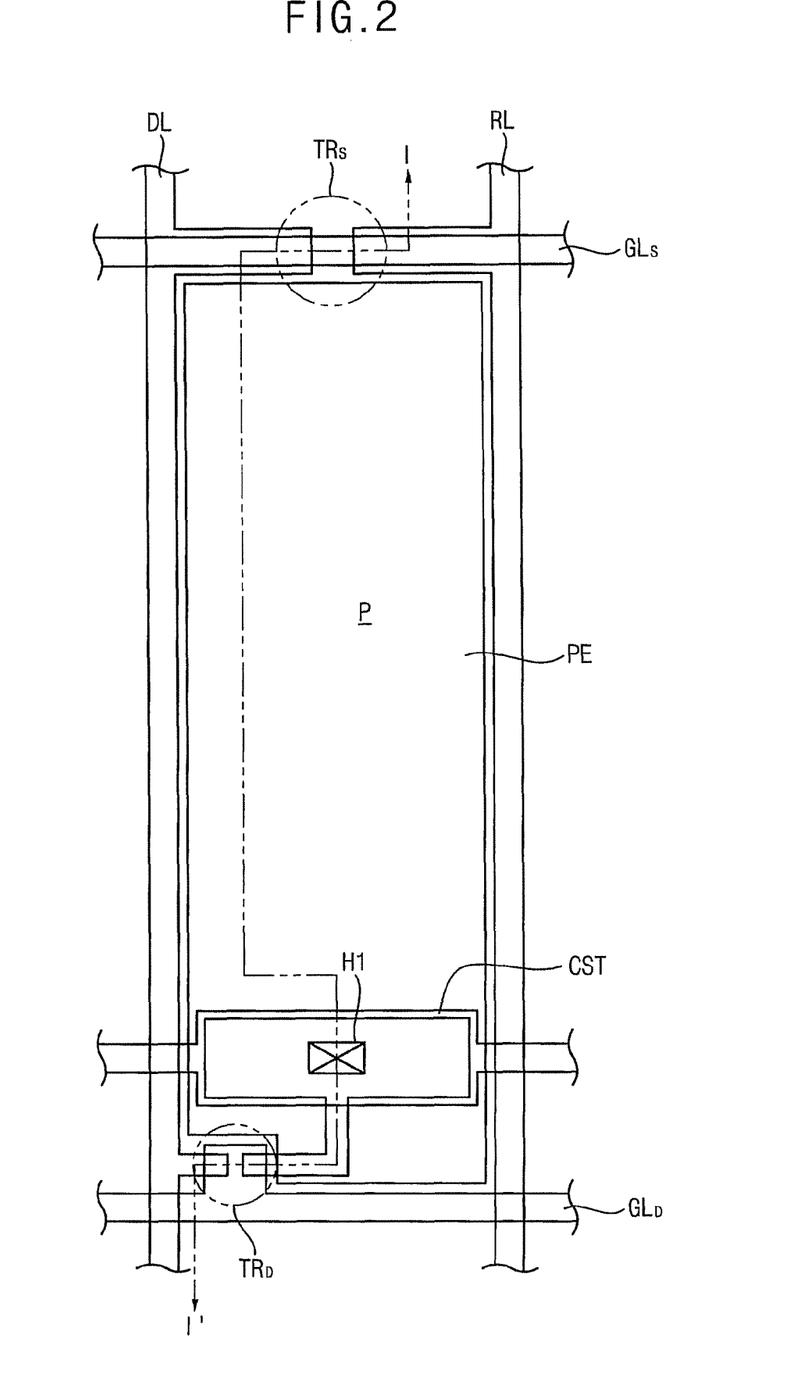
FIG. 2 is a plan view schematically illustrating the exemplary EPD panel of FIG. 1.
Figure 3:
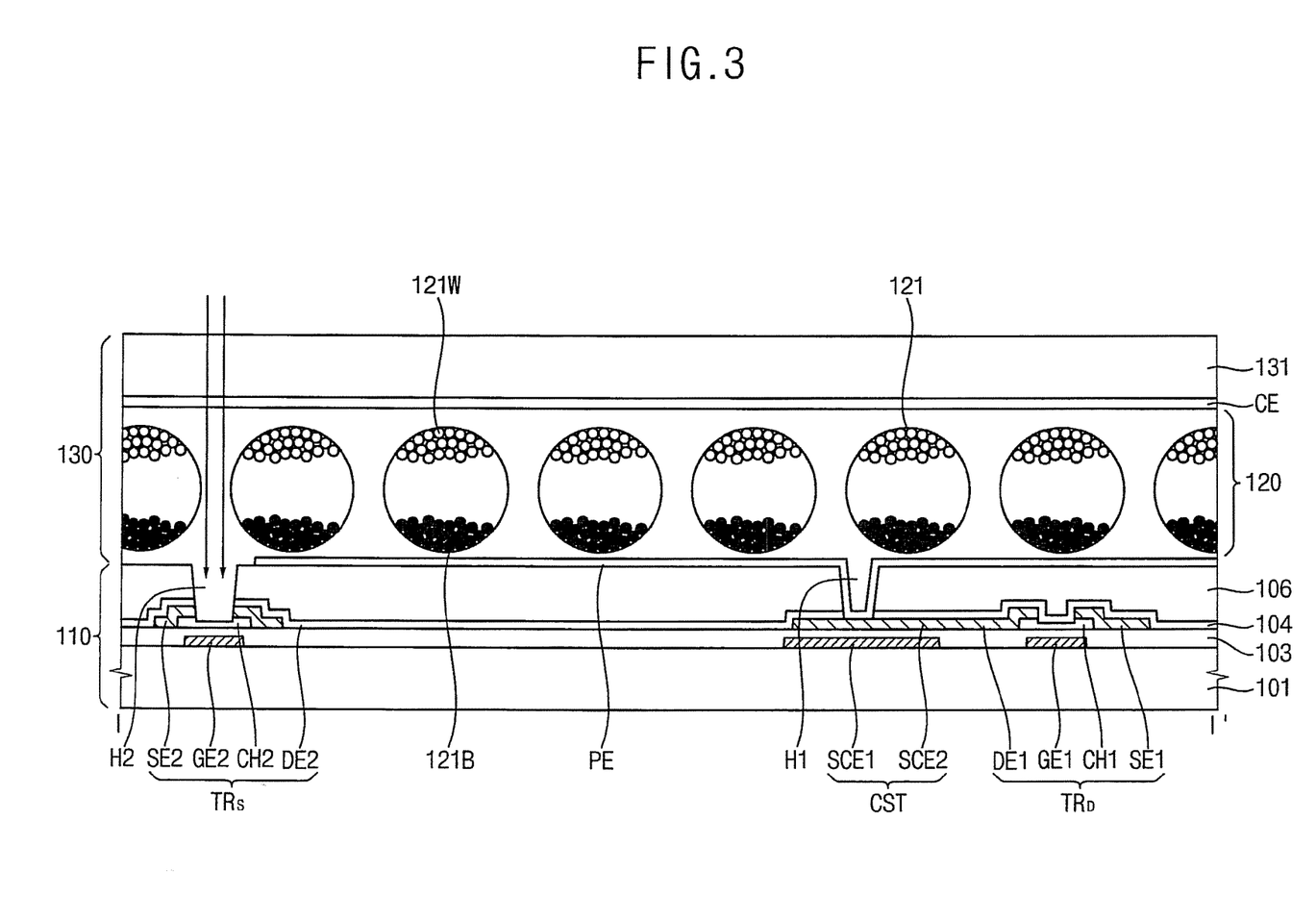
FIG. 3 is a cross-sectional view taken along line I-I' in FIG. 2.

FIG. 2 is a plan view schematically illustrating the exemplary EPD panel of FIG. 1, and FIG. 3 is a cross-sectional view taken along line I-I' in FIG. 2.

Referring to FIGS. 2 and 3, the EPD panel 100 includes a display substrate 110 and an electrophoretic film 130.

The display substrate 110 includes a first base substrate 101. A plurality of display gate lines $GL_D$ and a plurality of sensing gate lines $GL_S$ are formed on the first base substrate

101 and are extended along a first direction. A plurality of data lines DL is formed on the first base substrate 101 and extended along a second direction substantially crossing the first direction. The second direction may be substantially perpendicular to the first direction. In the present exemplary embodiment, the sensing gate lines $GL_S$ are formed substantially in parallel with the display gate lines $GL_D$, however, the sensing gate lines $GL_S$ may also be aligned in various arrangements.

In one exemplary embodiment, the data lines DL and the display gate lines $GL_D$ may define the plurality of pixel parts P on the first base substrate 101, however, the pixel parts P may also be otherwise defined. A display switching element $TR_D$, a pixel electrode PE, and a storage capacitor CST may be formed in the pixel parts P. A sensing switching element $TR_S$ may further be formed on all the pixel parts P or at least some of the pixel parts P.

The display switching element $TR_D$ includes a first gate electrode GE1, a gate insulation layer 103, a first channel part CH1, a first source electrode SE1, and a first drain electrode DE1. The first gate electrode GE1 is electrically connected to the first display gate line $GL_D$. The first gate electrode GE1 may be formed on the first base substrate 101. The gate insulation layer 103 is formed on the first gate electrode GE1, and may be further formed on exposed portions of the first base substrate 101. The first channel part CH1 is formed on the gate insulation layer 103 to be overlapped with the first gate electrode GE1. The first source electrode SE1 is formed on the gate insulation layer 103 to at least partially overlap the first channel part CH1. The first source electrode SE1 is electrically connected to the data line DL, which may also be formed on the gate insulation layer 103. The first drain electrode DE1 is formed on the gate insulation layer 103 to at least partially overlap the first channel part CH1 to be spaced apart from the first source electrode SE1. A protection layer 104 and an organic layer 106 are formed on the display switching element $TR_D$. The protection layer 104 may be further formed on exposed portions of the gate insulation layer 103. A pixel electrode PE is formed on the organic layer 106 and electrically connected to the first drain electrode DE1 through a contact hole H1 formed in the protection layer 104 and the organic layer 106.

The storage capacitor CST includes a first storage electrode SCE1, the gate insulation layer 103 and a second storage electrode SCE2. The first storage electrode SCE1 is electrically connected to a storage common line, and may be formed on the first base substrate 101. The gate insulation layer 103 is formed on the first storage electrode SCE1. The second storage electrode SCE2 is formed on the gate insulation layer 103 to be overlapped with the first storage electrode SCE1. The second storage electrode SCE2 may be formed as an extension of the first drain electrode DE1. The second storage electrode SCE2 is electrically connected to the pixel electrode PE.

The sensing switching element $TR_S$ includes a second gate electrode GE2, the gate insulation layer 103, a second channel part CH2, a second source electrode SE2, and a second drain electrode DE2. The second gate electrode GE2 is electrically connected to the sensing gate line $GL_S$. The second gate electrode GE2 may be formed on the first base substrate 101. The gate insulation layer 103 is formed on the second gate electrode GE2. The second channel part CH2 is formed on the gate insulation layer 103 to be overlapped with the second gate electrode GE2. The second source electrode SE2 and the second drain electrode DE2 are formed on the gate insulation layer 103 and each partially overlapping the second channel part CH2 to be spaced apart from each other. The second source electrode SE2 is electrically connected to the data line DL, and the second drain electrode DE2 is electrically connected to the readout line RL. The readout line RL may also be formed on the gate insulation layer 103. The protection layer 104 and the organic layer 106 are formed on the sensing switching element $TR_S$. A hole H2 may be formed in the sensing switching element $TR_S$ to expose the second channel part CH2. The sensing switching element $TR_S$ outputs a sensing signal to the readout line RL, the sensing signal corresponding to a light quantity incident to the second channel part CH2.

The electrophoretic film 130 includes a second base substrate 131, a common electrode CE and an electrophoretic layer 120. The second base substrate 131 may include a flexible material. The second base substrate 131 may include a polymer resin having superior light transparency, heat resistance, chemical resistance, mechanical strength, etc. The polymer resin may include polymethylmethacrylate, polyamide, polyimide, polypropylene, polyurethane, etc.

The common electrode CE may include an optically transparent and electrically conductive material. The common electrode CE, as an opposite electrode facing the pixel electrodes PE, receives a common voltage VCOM. The common electrode CE includes, for example indium tin oxide ("ITO"), indium zinc oxide ("IZO"), amorphous-indium tin oxide ("a-ITO"), etc. These may be used alone or in a combination thereof.

Although not shown in FIGS. 1 and 2, the EPD panel 100 may further include a color filter layer within the electrophoretic film 130. The color filter layer may be formed in correspondence with the pixel electrode PE. The color filter layer may be formed between the second base substrate 131 and the common electrode CE. Alternatively, the color filter layer may be formed between the common electrode CE and the electrophoretic layer 120.

The electrophoretic layer 120 includes a plurality of microcapsules 121. Each of the microcapsules 121 includes a plurality of electrophoretic particles charged as a positive polarity charge and a plurality of electrophoretic particles charged as a negative polarity charge. For example, each of the microcapsules 121 include white particles, such as a white pigment 121W, indicating the negative polarity charge and black particles, such as a black pigment 121B, indicating the positive polarity charge. An exemplary method for driving the electrophoretic layer 120 will be described as follows.

When a positive data voltage with respect to the common voltage VCOM is applied to the pixel electrode PE, the negatively charged white pigment 121W is moved to the pixel electrode PE and the positively charged black pigment 121B is moved to the common electrode CE. Thus, a black image is displayed on the EPD panel 100.

In contrast, when a negative data voltage with respect to the common voltage VCOM is applied to the pixel electrode PE, the positively charged black pigment 121B is moved to the pixel electrode PE and the negatively charged white pigment 121W is moved to the common electrode CE. Thus, a white image is displayed on the EPD panel 100.

When the data voltage is not applied to the pixel electrode PE, the white and black particles 121W and 121B are stopped to maintain a current position thereof. That is, the currently displayed image remains displayed on the EPD panel 100.

Figure 4:
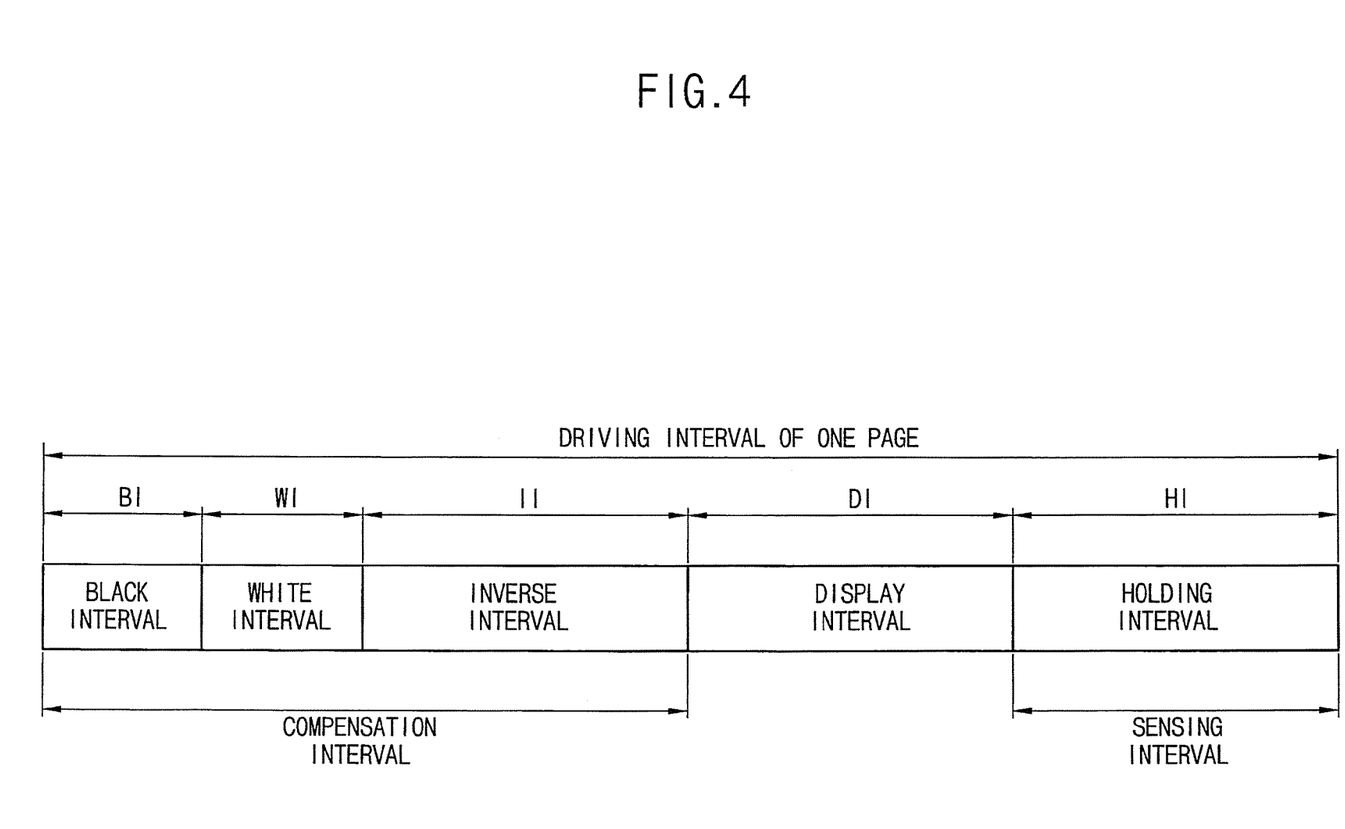
FIG. 4 illustrates waveform diagrams of a driving state of the exemplary EPD device of FIG. 1.

FIG. 4 illustrates waveform diagrams of a driving state of the exemplary EPD device of FIG. 1.

Referring to FIGS. 1 and 4, a driving interval for displaying a K-th image includes a black interval BI, a white interval WI, an inverse interval II, a display interval DI, and a holding interval HI, wherein "K" is a natural number.

The black interval BI is an interval displaying a black image on the EPD panel 100, and the white interval WI is an interval displaying a white image on the EPD panel 100. While the driving interval shown in FIG. 4 may correspond to when a black image is displayed on a white background image, in an alternative exemplary embodiment, a white image may be displayed on a black background image. The inverse interval II is an interval displaying a data signal inversed by the K-th image data.

The black interval BI, the white interval WI, and the inverse interval II are a compensation interval that resets the voltage charged in the electrophoretic capacitor EPC using a (K−1)-th image data that is previously displayed on the EPD panel 100.

The display interval DI is an interval that displays a data signal of the K-th image data signal. The holding interval HI is an interval that holds the K-th image displayed on the EPD panel 100 during the display interval DI.

The sensing signal sensed in the EPD panel 100 is outputted during the holding interval HI. Thus, the holding interval HI also corresponds to a sensing interval.

FIGS. 5A to 5G are schematic diagrams illustrating an exemplary method for driving an exemplary EPD panel of FIG. 1.

Figure 5A:
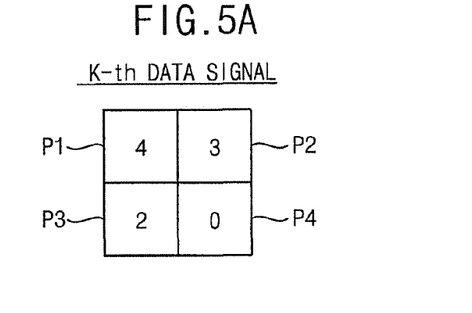
FIGS. 5A to 5G are schematic diagrams illustrating an exemplary method for driving the exemplary EPD panel of FIG. 1.

For example, a 2×2 pixel structure as shown in FIG. 5A will be described. In the 2×2 pixel structure, a data signal of the first pixel part P1 corresponds to "4" (i.e., 0-gray), a data signal of the second pixel part P2 corresponds to "3" (i.e., 1-gray), a data signal of the third pixel part P3 corresponds to "2" (i.e., 2-gray), and a data signal of the fourth pixel part P4 corresponds to "0" (i.e., 4-gray). The first to fourth pixel parts P1, P2, P3 and P4 may have a positive gradation. Here, the 0-gray corresponds to a black gradation image, and the 4-gray corresponds to a white gradation image.

Figure 5B:
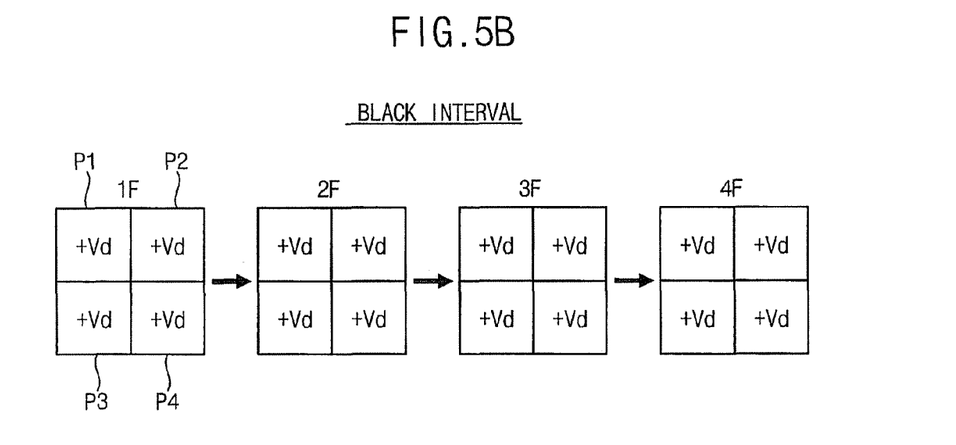

Referring to FIGS. 1 and 5B, during a black interval BI, the data driving part 210 outputs a positive data voltage +Vd to the first, second, third and fourth pixel parts P1, P2, P3 and P4. A length of the black interval BI may be set by a response speed according to a voltage of the electrophoretic particles. Hereinafter, four frames will be described.

During from a first frame 1F to a fourth frame 4F of the black interval BI, the data driving part 210 outputs a positive voltage +Vd to the first, second, third and fourth pixel parts P1, P2, P3 and P4. Accordingly, the negatively charged white particles 121W of the electrophoretic particles are moved to the pixel electrode PE, and the positively charged black particles 121B of the electrophoretic particles are moved to the common electrode CE, so that the first, second, third and fourth pixel parts P1, P2, P3 and P4 display a black image.

Figure 5C:
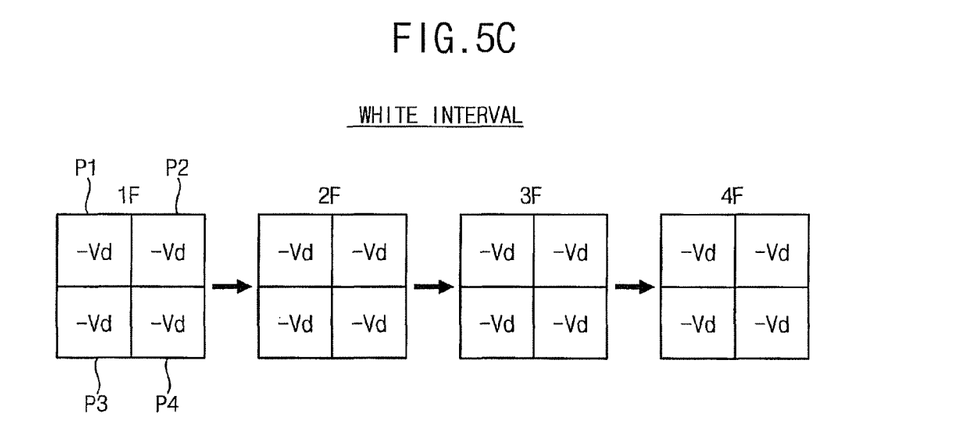

Referring to FIGS. 1 and 5C, during a white interval WI, the data driving part 210 outputs a negative data voltage −Vd to the first, second, third and fourth pixel parts P1, P2, P3 and P4. A length of the white interval WI may be substantially equal to that of the black interval BI. Hereinafter, the four frames will be described.

During from a first frame 1F to a fourth frame 4F of the white interval WI, the data driving part 210 outputs a negative voltage −Vd to the first, second, third and fourth pixel parts P1, P2, P3 and P4. Accordingly, the positively charged black particles 121B of the electrophoretic particles are moved to the pixel electrode PE, and the negatively charged white particles 121W of the electrophoretic particles are moved to the common electrode CE, so that the first, second, third and fourth pixel parts P1, P2, P3 and P4 display a white image.

Figure 5D:
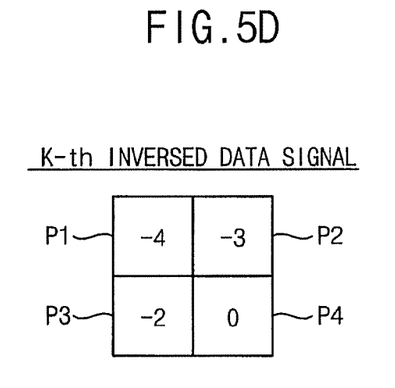
Figure 5E:
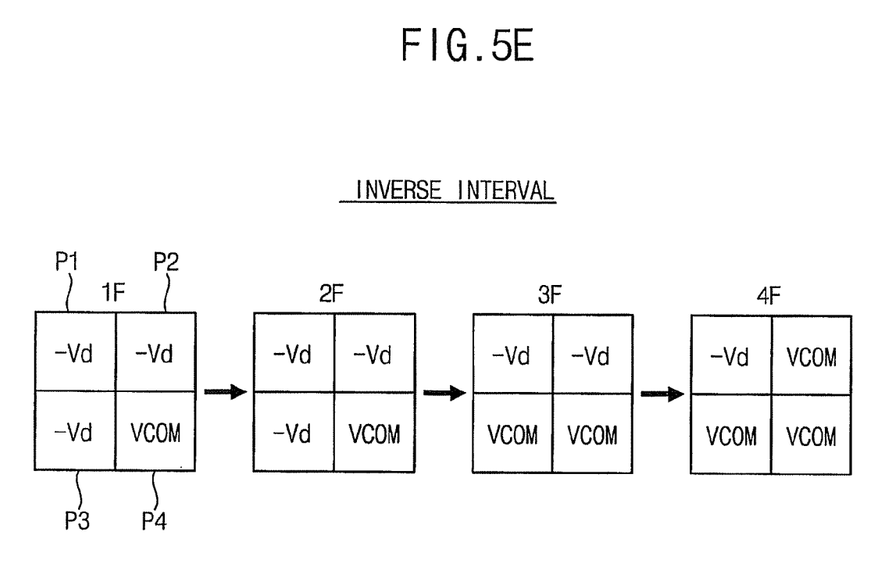

Referring to FIGS. 1, 5D and 5E, during an inversed interval II, the data driving part 210 outputs a data signal that is inversed to a data signal of the K-th image data signal.

Referring to FIG. 5D, the inversed data signal of the K-th image may have a negative gradation. For example, the first pixel part P1, the second pixel part P2, the third pixel part P3 and the fourth pixel part P4 are −4 (i.e., −0 gray), −3 (i.e., −1 gray), −2 (i.e., −2 gray) and 0 (i.e., −4 gray), respectively.

The data driving part 210 outputs a negative data voltage −Vd to the first to third pixel parts P1, P2 and P3 during a first frame 1F of the inverse interval II, and outputs a common voltage VCOM to the fourth pixel part P4.

During a second frame 2F, the data driving part 210 outputs the negative data voltage −Vd to the first to third pixel parts P1, P2 and P3, and outputs the common voltage VCOM to the fourth pixel part P4. During a third frame 3F, the data driving part 210 outputs the negative data voltage −Vd to the first and second pixel parts P1 and P2, and outputs the common voltage VCOM to the third and fourth pixel parts P3 and P4.

During a fourth frame 4F, the data driving part 210 outputs the negative data voltage −Vd to the first pixel part P1, and outputs the common voltage VCOM to the second to fourth pixel parts P2, P3 and P4.

Consequently, during the inverse interval II, the negative data voltage −Vd is applied to the first pixel part P1 in four frames, and the negative data voltage −Vd is applied to the second pixel part P2 in three frames. Moreover, the negative data voltage −Vd is applied to the third pixel part P3 in two frames, and the common voltage VCOM is applied to the fourth pixel part P4 in four frames. Therefore, a K-th inverse image is displayed on the first to fourth pixel parts P1, P2, P3 and P4.

Figure 5F:
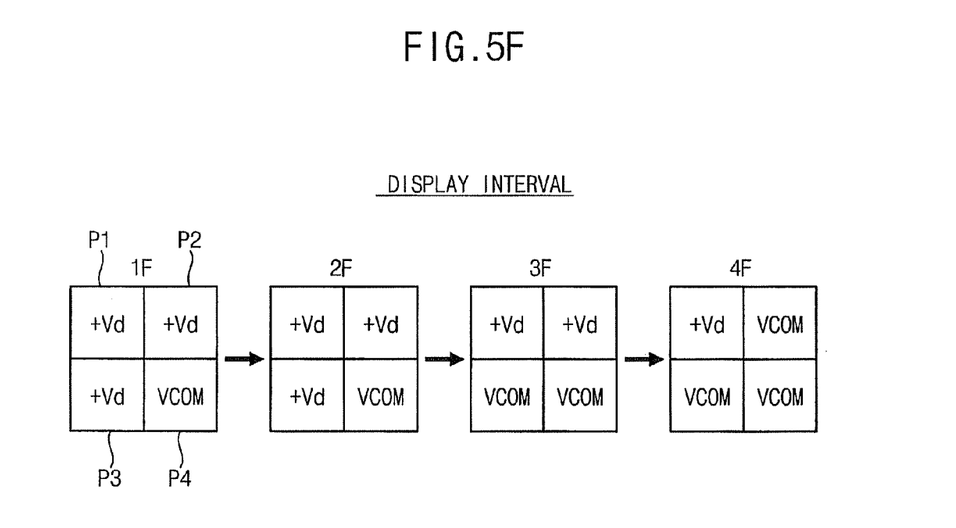

Referring to FIGS. 1, 5A and 5F, during the display interval DI, the data driving part 210 outputs a data signal of the K-th image. The data signal of the K-th image may have a positive gradation, as shown in FIG. 5A. For example, the first pixel part P1, the second pixel part P2, a third pixel part P3 and a fourth pixel part P4 are 4, 3, 2 and 0, respectively.

The data driving part 210 outputs a positive data voltage +Vd to the first to third pixel parts P1, P2 and P3, and outputs the common voltage VCOM to the fourth pixel part P4, during a first frame 1F of the display interval DI.

The data driving part 210 outputs a positive data voltage +Vd to the first to third pixel parts P1, P2 and P3, and outputs the common voltage VCOM to the fourth pixel part P4, during a second frame 2F of the display interval DI.

The data driving part 210 outputs a positive data voltage +Vd to the first and second pixel parts P1 and P2, and outputs the common voltage VCOM to the third and fourth pixel parts P3 and P4, during a third frame 3F of the display interval DI.

The data driving part 210 outputs a positive data voltage +Vd to the first pixel part P1, and outputs the common voltage VCOM to the second to fourth pixel parts P2, P3 and P4, during a fourth frame 4F of the display interval DI.

Consequently, in the display interval DI, the first pixel part P1 receives the positive data voltage +Vd to display an image corresponding to 4-gradation during four frames, and the second pixel part P2 receives the positive data voltage +Vd to display an image corresponding to 3-gradation during three frames. Moreover, the third pixel part P3 receives the positive data voltage +Vd to display an image corresponding to 2-gradation during two frames, and the fourth pixel part P4 receives the common voltage VCOM to display an image corresponding to 0-gradation. Therefore, the K-th image is displayed on the first to fourth pixel parts P1, P2, P3 and P4.

Figure 5G:
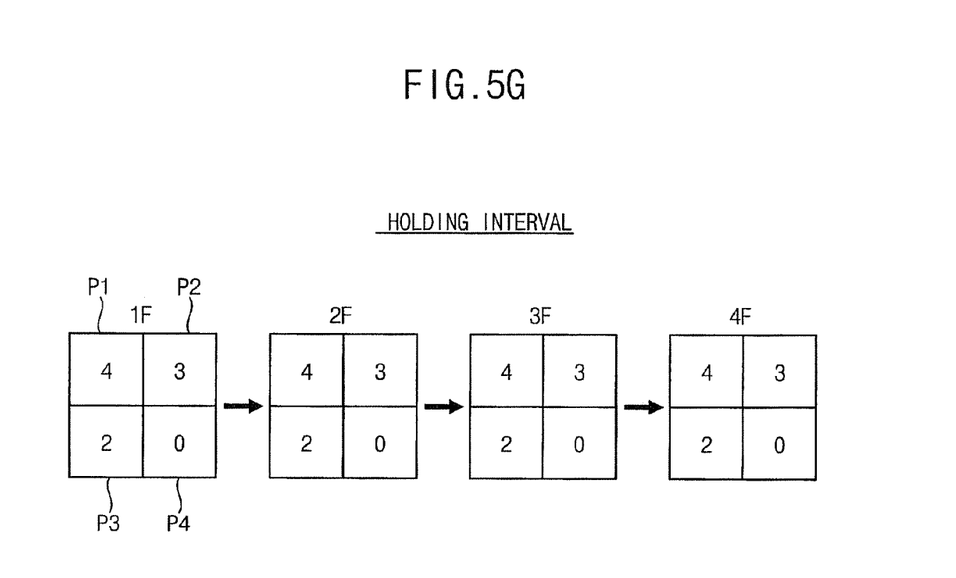

Referring to FIGS. 1 and 5G, during the holding interval HI, the first to fourth pixel parts P1, P2, P3 and P4 maintain the image displayed during the display interval DI.

In the holding interval HI, corresponding to a sensing interval, the first to fourth pixel parts P1, P2, P3 and P4 do not receive the data voltage Vd but instead receive a bias voltage Vb, so that the display switching element TR$_D$ is turned off and the sensing switching element TR$_S$ is turned on. Thus, the bias voltage Vb outputted from the data driving part 210 is not applied to the electrophoretic capacitor EPC, and is applied to the sensing switching element TR$_S$, so that the sensing switching element TR$_S$ is activated.

Accordingly, a voltage is not applied to each electrophoretic capacitor EPC of the first to fourth pixel parts P1, P2, P3 and P4 during the holding interval HI, so that the data voltage Vd charged during the display interval DI is maintained. The sensing switching element TR$_S$ is activated to output the sensing signal.

Figure 6:
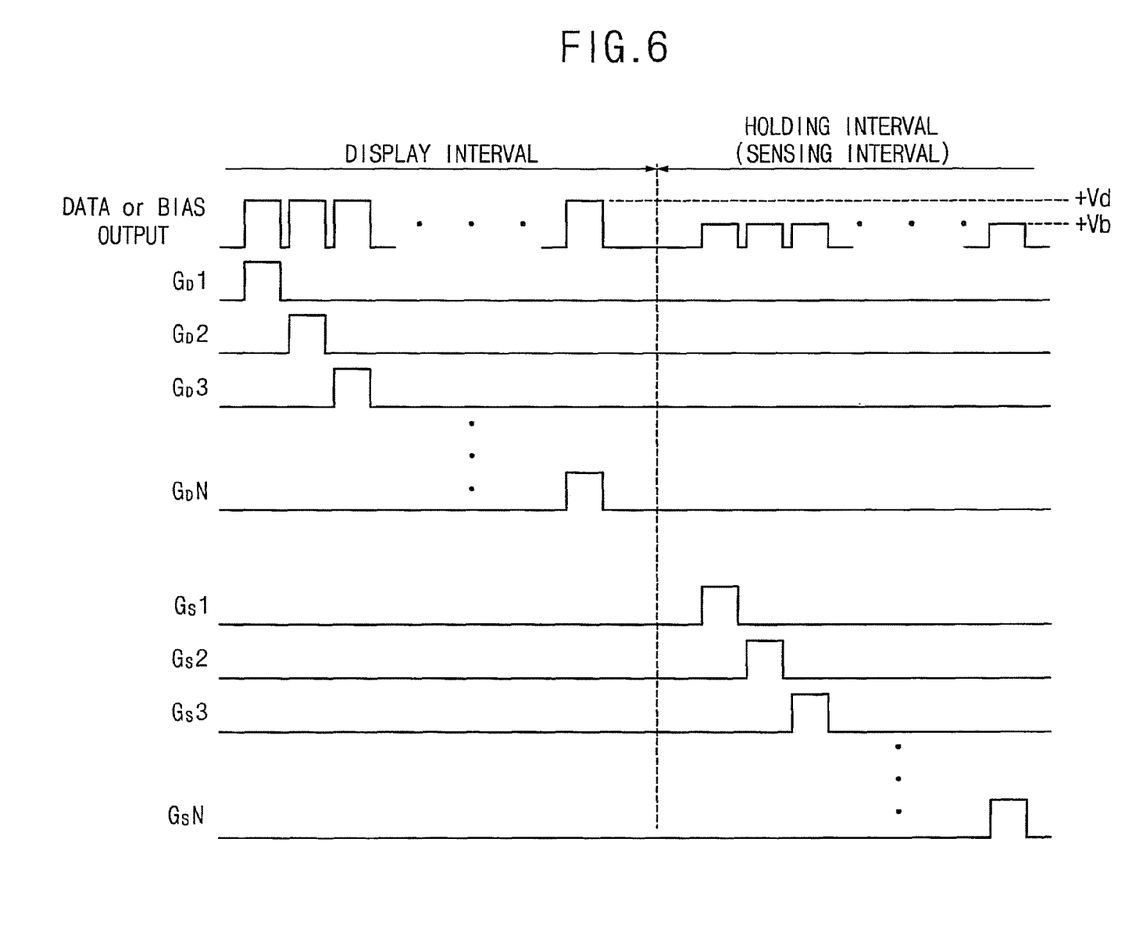
FIG. 6 illustrates waveform diagrams of a driving signal of the exemplary EPD panel of FIG. 1.

FIG. 6 illustrates waveform diagrams of a driving signal of the exemplary EPD panel of FIG. 1.

Referring to FIGS. 1, 4 and 6, during a compensation interval and a display interval DI, the data driving part 210 outputs a positive data voltage +Vd and a negative data voltage −Vd to the data lines DL of the EPD panel 100. The compensation interval includes the black interval BI, the white interval WI, and the inverse interval II. During the compensation interval and the display interval DI, the display gate driving part 230 outputs display gate signals GD1 to GDN to the display gate lines GL$_D$ of the EPD panel 100.

For example, the data driving part 210 outputs a positive data voltage +Vd to the data lines DL during the display interval DI, as shown in FIG. 6. For example, the positive data voltage +Vd may be about 10V to about 15V, and the negative data voltage −Vd may be about −10V to about −15V. The display gate driving part 230 outputs display gate signals GD1 to GDN to the display gate lines GL$_D$ in correspondence with an output interval 1H of the data driving part 210.

Accordingly, each of the electrophoretic capacitors EPC formed in each pixel part P of the EPD panel 100 charges the data voltage Vd to display a gradation image.

During the holding interval HI, the data driving part 210 outputs a bias voltage Vb to the data lines DL of the EPD panel 100, and the sensing gate driving part 270 outputs sensing gate signals GS1 to GSN to the sensing gate lines GL$_S$. For example, the bias voltage Vb may be an amount less than that of the data voltage Vd, and may be about 2V to about 10V.

For example, the data driving part 210 outputs a bias voltage +Vb to the data lines DL during the holding interval HI as shown in FIG. 6. The sensing gate driving part 270 outputs the sensing gate signals GS1 to GSN to the sensing gate lines GL$_S$ in correspondence with the output interval 1H of the data driving part 210.

Accordingly, the sensing switching element TR$_S$ formed in all of the pixel parts P or some of the pixel parts P of the EPD panel 100 senses the light quantity to output the sensing signal.

During the holding interval HI, the display gate signals GD1 to GDN are not outputted from the display gate driving part 230, so that the display switching element TR$_D$ of the EPD panel 100 may be turned off. Therefore, the bias voltage +Vb applied to the data lines DL is not delivered to the electrophoretic capacitor EPC, and the electrophoretic capacitor EPC may maintain the data voltage Vd charged in the display interval DI.

As described above, according to the present invention, the display switching element and the sensing switching element share the data line in the EPD panel, so that the number of lines may be reduced. During an interval that maintains an image displayed in accordance to driving characteristics of the EPD panel, the bias signal driving the sensing switching element is applied through the data line, so that the sensing switching element may be activated so that the sensing signal may be detected.

Therefore, the data line is shared by the display switching element and the sensing switching element, so that a manufacturing process may be simplified and a manufacturing cost may be reduced. Furthermore, an aperture ratio of the pixel part may be enhanced.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. An electrophoretic display panel comprising:
a display substrate including a display switching element electrically connected to a display gate line and a data line crossing the display gate line, a pixel electrode electrically connected to the display switching element, and a sensing switching element electrically connected to a sensing gate line and having a source electrode electrically connected to the data line to detect a light quantity, wherein the sensing switching element receives a bias signal through the data line; and
an electrophoretic film combined with the display substrate, the electrophoretic film including a plurality of charged particles.

2. The electrophoretic display panel of claim 1, wherein the electrophoretic film further comprises a common electrode opposite to the pixel electrode, and the charged particles are interposed between the pixel electrode and the common electrode.

3. The electrophoretic display panel of claim 1, wherein the electrophoretic film further comprises a color filter layer corresponding with an area of the display substrate having the pixel electrode formed thereon.

4. The electrophoretic display panel of claim 1, wherein the display panel further comprises an output line electrically connected to the sensing switching element to output a sensing signal corresponding to sensed light quantity.

5. The electrophoretic display panel of claim 4, wherein the output line is substantially parallel with the data line.

6. The electrophoretic display panel of claim 1, wherein a drain electrode of the sensing switching element is electrically connected to an output line, and a hole between the source electrode and the drain electrode exposes a channel part of the sensing switching element to light.

7. The electrophoretic display panel of claim 1, wherein the data line delivers a data signal to the display switching element during a first interval of a driving interval that displays a K-th image, and delivers the bias signal to the sensing switching element during a second interval of the driving interval that displays the K-th image.

8. An electrophoretic display device comprising:
an electrophoretic display panel including a display switching element electrically connected to a display gate line and a data line, an electrophoretic capacitor electrically connected to the display switching element to include an electrophoretic layer, and a sensing switching element electrically connected to a sensing gate line and having a source electrode electrically connected to the data line to detect a light quantity, wherein the sensing switching element receives a bias signal through the data line; and
a driving section displaying an image on the electrophoretic display panel by activating the display switching element during a first interval, and receiving a sensing signal by activating the sensing switching element during a second interval.

9. The electrophoretic display device of claim 8, wherein the electrophoretic display panel further comprises an output line electrically connected to the sensing switching element to output the sensing signal.

10. The electrophoretic display device of claim 8, wherein the electrophoretic capacitor further comprises:
- a pixel electrode electrically connected to the display switching element; and
- a common electrode opposite to the pixel electrode, the electrophoretic layer interposed between the pixel electrode and the common electrode.

11. The electrophoretic display device of claim 8, wherein the driving section comprises:
- a data driving section outputting a data signal to the data line during the first interval, and outputting a bias signal to the data line during the second interval;
- a display gate driving section outputting a display gate signal to the display gate line during the first interval to turn on the display switching element; and
- a sensing gate driving section outputting a sensing gate signal to the sensing gate line during the second interval to turn on the sensing switching element.

12. The electrophoretic display device of claim 8, wherein the first interval comprises an interval during which an image is displayed on the electrophoretic display panel.

13. The electrophoretic display device of claim 8, wherein the second interval comprises an interval during which an image displayed on the electrophoretic display panel is maintained.

14. A method for driving an electrophoretic display device, the method comprising:
- applying a data signal to a data line electrically connected to an electrophoretic capacitor including charged particles to charge a data voltage to the electrophoretic capacitor during a first interval; and
- applying a bias signal of a sensing switching element to the data line to output a sensing signal during a second interval.

15. The method of claim 14, wherein the second interval comprises an interval in which a data voltage charged in the electrophoretic capacitor is maintained.

16. The method of claim 14, wherein outputting the sensing signal comprises:
- applying a sensing gate signal to a sensing gate line crossing the data line to turn on the sensing switching element; and
- outputting the sensing signal sensed by the sensing switching element through an outputting line substantially parallel with the data line.

17. The method of claim 14, wherein charging the data voltage comprises:
- applying a display gate signal to a display gate line crossing the data line to turn on a display switching element electrically connected to the data line; and
- charging the data voltage outputted from the display switching element to the electrophoretic capacitor.

18. The method of claim 14, wherein charging the data voltage further comprises resetting the data voltage charged in the electrophoretic capacitor.

19. The method of claim 18, wherein resetting the data voltage comprises:
- charging a data voltage of a black gradation image in the electrophoretic capacitor; and
- charging a data voltage of a white gradation image in the electrophoretic capacitor.

20. The method of claim 18, wherein resetting the data voltage further comprises charging a voltage inverted in polarity of the data voltage with respect to a common voltage.

* * * * *